(12) United States Patent
Lefsrud et al.

(10) Patent No.: US 9,750,200 B2
(45) Date of Patent: Sep. 5, 2017

(54) APPARATUS FOR CARBON DIOXIDE ENRICHMENT

(71) Applicant: Royal Institution for the Advancement of Learning/McGill University, Montreal (CA)

(72) Inventors: Mark Lefsrud, Hudson (CA); Yves Roy, Brossard (CA); Francis Filion, St-Eustache (CA); Julien Bouchard, Hemmingford (CA); Quoc Nguyen, Montreal (CA); Louis-Martin Dion, Montreal (CA); Antony Glover, Laval (CA)

(73) Assignee: Royal Institution for the Advancement of Learning/McGill University, Montréal (CA)

( * ) Notice: Subject to any disclaimer, the term of this patent is extended or adjusted under 35 U.S.C. 154(b) by 0 days.

(21) Appl. No.: 14/904,136

(22) PCT Filed: Jul. 11, 2014

(86) PCT No.: PCT/CA2014/000565
§ 371 (c)(1),
(2) Date: Jan. 11, 2016

(87) PCT Pub. No.: WO2015/003252
PCT Pub. Date: Jan. 15, 2015

(65) Prior Publication Data
US 2016/0150742 A1    Jun. 2, 2016

Related U.S. Application Data

(60) Provisional application No. 61/844,976, filed on Jul. 11, 2013.

(51) Int. Cl.
  *B01D 50/00* (2006.01)
  *A01G 9/18* (2006.01)
  (Continued)

(52) U.S. Cl.
  CPC ............ *A01G 9/18* (2013.01); *A01G 7/02* (2013.01); *B01D 53/50* (2013.01); *B01D 53/56* (2013.01);
  (Continued)

(58) Field of Classification Search
  CPC ...... B01D 53/50; B01D 53/62; B01D 53/869; B01D 2256/22; B01D 2257/404; B01D 2257/708
  (Continued)

(56) References Cited

U.S. PATENT DOCUMENTS 2,531,356 A    11/1950    Evans
2,935,374 A    5/1960    Brooks
(Continued)

FOREIGN PATENT DOCUMENTS

CA    2745174 A1    1/2012
CN    101040592 B    5/2011
(Continued)

OTHER PUBLICATIONS

Dion, et al., "Review of CO2 recovery methods from the exhaust gas of biomass heating systems for safe enrichment in greenhouses", Biomass and Bioenergy, 2011, 35(8): 3422-3432.
(Continued)

*Primary Examiner* — Tom P Duong
(74) *Attorney, Agent, or Firm* — ABM Intellectual Property Inc.; Adrienne Bieber McNeil (57) ABSTRACT

A flue gas treatment apparatus has a flue gas inlet, a treated gas outlet downstream of the flue gas inlet, and a gas flow path therebetween. The flue gas treatment apparatus comprises a particulate removal device. A first heater is downstream of the particulate removal device. The first heater heats the flue gas to a first treatment temperature. A first catalytic converter is downstream of the first heater for
(Continued)

eliminating at least some CO and $SO_2$ from the flue gas. A second heater is downstream of the first catalytic converter for heating the flue gas to a second treatment temperature. A second catalytic converter is downstream of the second heater for eliminating at least some NOx from the flue gas. At least a first fan forces the flue gas from the flue gas inlet to the treated gas outlet.

12 Claims, 6 Drawing Sheets

(51) Int. Cl.
| | |
|---|---|
| F23J 15/02 | (2006.01) |
| A01G 7/02 | (2006.01) |
| F27B 17/00 | (2006.01) |
| F27D 99/00 | (2010.01) |
| B01D 53/86 | (2006.01) |
| B01D 53/88 | (2006.01) |
| B01D 53/50 | (2006.01) |
| B01D 53/56 | (2006.01) |
| B01D 53/62 | (2006.01) |

(52) U.S. Cl.
CPC ............. *B01D 53/62* (2013.01); *B01D 53/86* (2013.01); *B01D 53/869* (2013.01); *B01D 53/885* (2013.01); *F23J 15/02* (2013.01); *F27B 17/0016* (2013.01); *F27D 99/0033* (2013.01); *B01D 2255/1023* (2013.01); *B01D 2255/702* (2013.01); *B01D 2256/22* (2013.01); *B01D 2257/302* (2013.01); *B01D 2257/404* (2013.01); *B01D 2257/502* (2013.01); *B01D 2257/708* (2013.01); *B01D 2258/0283* (2013.01); *Y02P 10/122* (2015.11); *Y02P 60/24* (2015.11)

(58) Field of Classification Search
USPC .................................. 422/168, 169, 177, 180
See application file for complete search history.

(56) References Cited

U.S. PATENT DOCUMENTS

| | | | |
|---|---|---|---|
| 4,427,362 A | 1/1984 | Dykema | |
| 5,078,973 A | 1/1992 | Kuroda et al. | |
| D329,693 S | 9/1992 | Mills | |
| 5,198,403 A | 3/1993 | Brand et al. | |
| 5,300,472 A | 4/1994 | Brand et al. | |
| 5,372,706 A | 12/1994 | Buchanan et al. | |
| 5,547,648 A | 8/1996 | Buchanan et al. | |
| 5,591,417 A * | 1/1997 | Buchanan | B01D 53/04 423/210 |
| 5,747,042 A | 5/1998 | Choquet | |
| D450,821 S | 11/2001 | Mills | |
| D450,822 S | 11/2001 | Mills | |
| 6,610,264 B1 | 8/2003 | Buchanan et al. | |
| 6,945,925 B2 | 9/2005 | Pooler et al. | |
| 7,278,895 B2 | 10/2007 | Levander | |
| 2005/0019159 A1* | 1/2005 | Lyons | F04D 29/4226 415/213.1 |
| 2010/0024476 A1* | 2/2010 | Shah | B01D 53/002 62/617 |
| 2014/0010748 A1* | 1/2014 | Kim | B01D 53/8625 423/239.1 |
| 2014/0134061 A1* | 5/2014 | Broderick | F23J 15/003 422/169 |
| 2014/0255283 A1* | 9/2014 | Sidheswaran | B01J 23/34 423/245.1 |

FOREIGN PATENT DOCUMENTS

| | | |
|---|---|---|
| DE | 2649642 A1 | 5/1977 |
| DE | 3415970 A1 | 10/1985 |
| DE | 10220797 B4 | 2/2006 |
| EP | 1 226 862 A2 | 7/2002 |
| JP | 2000157048 A | 6/2000 |
| JP | 2000188969 A | 7/2000 |
| JP | 2013-78759 A | 5/2013 |
| WO | 2010/080022 A1 | 7/2010 |

OTHER PUBLICATIONS

Mortensen, "Review: CO2 enrichment in greenhouses. Crop Responses," Scientia Horticulturae, 1987, 33(1-2): 1-25.
Ministry of Health, Health Canada, ed., "Residential Indoor Air Quality Guidelines", Ottawa, Canada: Government of Canada, 2012—website modified Dec. 22, 2015 (http://healthycanadians.gc.ca/healthy-living-vie-saine/environment-environment/air/guidelines-lignes-directrices-eng.php).
Janes, et al., "Landfill Gas to Energy: A Demonstration Controlled Environment Agriculature System", HortScience, 2005, 40(2): 279-282.
Léveillée, et al., "Évaluation de l'innocuité et du rendement technico-économique d'un générateur de CO2 à maïs pour les serres", Saint-Hyacinthe, Centre d'information et de développement expérimental en serriculture (CIDES), 1996, pp. 1-23.
Literature Review—Van Loo, et al., "The handbook of biomass combustion and co-firing", London: Sterling, VA, Earthscan, 2008, 2 pages.
Chau, et al., "Techno-economic analysis of wood biomass boilers for the greenhouse industry", Applied Energy, 2009, 86(3): 364-371.
Long, et al., "Removal of Nitric Oxide and Sulfur dioxide from Flue Gas Using a Hexamminecobalt(II)/Iodide Solution", Industrial & Engineering Chemistry Research, 2004, 43(15): 4048-4053.
Chou, et al., "Producing Ammonium Sulfate from Flue Gas Desulfurization by-Products", Energy Sources, 2005, 27(11): 1061-1071.
McKendry, "Energy Production from Biomass (part 1): Overview of Biomass", Bioresource Technology, 2002a, 83(1), 37-46.
McKendry, "Energy Production from Biomass (part2): Conversion Technologies", Bioresource Technology, 2002b, 83(1), 47-54.
McKendry, "Energy production from biomass (part 3): Gasification Technologies", Bioresource Technology, 2002c, 83(1): 55-63.
Whitty, et al. "Emissions from Syngas Combustion", Combustion Science and Technology, 2008, 180(6): 1117-1136.
Basu, "Biomass Gasification and Pyrolysis: Practical Design and Theory", Academic Press, 2010, Burlington, MA, USA, 375 pages.
Clarke Energy, "GE's Jenbacher Gas Engines" (http://www.clarke-energy.com/gas-engines).
Vonen Ltd., "FRESCO2—The Only Air Purifier" (http://www.casavonen.com/en/FresCOIAQ.htm).
ProSelect, "GC6 Green Carbon Capture System" (http://gc6.ca/the-gc6-system/about-the-gc6).
Roy, McGill student poster, "Biomass Combustion for Greenhouse Carbon Dioxide Enrichment", 2012.
Promotional Material—General Electric, "Growing Your Greenhouse Business Faster with Gas Engines", Jan. 2014, 9 pages.
Roy, "Biomass Combustion for Greenhouse Carbon Dioxide Enrichment", ASABE Annual International Meeting written presentation, Kansas City, MI, 2013, pp. 3-15.
Thayer, Eco Enterprises, Hydrofarm, Inc., "Carbon Dioxide Enrichment Methods", 2013 (https://web.archive.org/web/20130119064049/http://hydrofarm.com/resources/articles/co2_enrichment.php).
Green Air Products Inc., Greenhouse Environmental Systems and Controls, Carbon Dioxide Enrichment, 2013 (https://web.archive.org/web/20130830101833/https://greenair.com).
Dion, "Biomass Gasification for Carbon Dioxide Enrichment in Greenhouses", Master's thesis, McGill University, Montreal, QC, 2011, 138 pages.

(56) References Cited

OTHER PUBLICATIONS

Producer of catalysts—Catalyseur National (http://catalyseurnational.com).
Producer of catalysts—Magnaflow (https://www.magnaflow.com/catalytic-converters).
Extended European Search Report dated May 9, 2017 in corresponding EP Patent Application No. 14822618.6.

* cited by examiner

APPARATUS FOR CARBON DIOXIDE ENRICHMENT

CROSS-REFERENCES TO RELATED APPLICATIONS

This application is a national phase entry of PCT Patent Application No. PCT/CA2014/000565, filed Jul. 11, 2014, which claims the benefit of U.S. Provisional Patent application No. 61/844,976, filed on Jul. 11, 2013, both of which are incorporated herein by reference in their entirety.

FIELD

The disclosure relates to an apparatus and method for carbon dioxide enrichment. Specifically, the disclosure relates to an apparatus and method for producing a stream of carbon dioxide that may be supplied to a greenhouse to enhance crop production.

BACKGROUND

U.S. Pat. No. 5,747,042 (Choquet) purports to disclose a method and apparatus for producing carbon dioxide, fungicidal compounds and thermal energy. The method comprises the steps of: (a) introducing into a forced fire combustion chamber a first stream of ambient air and a second stream consisting of a solid organic source selected from the solid organic fuels consisting of agricultural products including corn, shelled corn, crushed corn peat, corn kernels, ears of corns, corn cobs, straw, bagasse, wheat, beet, rye, barley, beans, potatoes, compressed organic material as a by-product of organic transformation industries or of wood transformation industries and mixtures thereof; (b) causing the combustion of said solid organic source resulting in the production of thermal energy, flue gas and waste ashes, said flue gas transporting said thermal energy and having a content indicative of a carbon dioxide production rate near a stoichiometric combustion equation; (c) maintaining said first stream at a pressure greater than standard atmospheric pressure; (d) periodically purging said waste ashes from said combustion chamber so as to favor the maintenance of a well-aerated forced fire; (e) transporting and cooling said flue gas by passage through a heat exchanging element at a positive pressure, thereby creating a pressurized stream of exhaust gas rich in carbon dioxide; and (f) accumulating said pressurized exhaust gas.

SUMMARY

The following summary is intended to introduce the reader to various aspects of the applicant's teaching, but not to define any invention.

According to one aspect, a flue gas treatment apparatus for treating a carbon dioxide rich flue gas comprises a flue gas inlet connectable in fluid communication with a flue gas outlet of a combustion furnace, a treated gas outlet downstream of the flue gas inlet, and a gas flow path therebetween. A particulate removal device is in the gas flow path for eliminating at least some particulate matter from the flue gas. At least a first catalytic converter is in the gas flow path downstream of the particulate removal device for eliminating at least some toxic contaminant gases from the flue gas. At least a first fan is provided for forcing the flue gas from the flue gas inlet to the treated gas outlet.

According to another aspect, an apparatus for carbon dioxide enrichment comprises a combustion furnace for generating a carbon dioxide rich flue gas. The combustion furnace has a flue gas outlet. A flue gas treatment apparatus has a flue gas inlet in communication with the flue gas outlet, a treated gas outlet downstream of the flue gas inlet, and a gas flow path therebetween. The flue gas treatment apparatus comprises a particulate removal device in the gas flow path for eliminating at least some particulate matter from the flue gas. At least a first catalytic converter is in the gas flow path downstream of the particulate removal device for eliminating at least some toxic contaminant gases from the flue gas. At least a first fan is provided for forcing the flue gas from the flue gas inlet to the treated gas outlet.

According to another aspect, a flue gas treatment apparatus for treating a carbon dioxide rich flue gas comprises a flue gas inlet connectable in fluid communication with a flue gas outlet of a combustion furnace, a treated gas outlet downstream of the flue gas inlet, and a gas flow path therebetween. A particulate removal device is in the gas flow path for eliminating at least some particulate matter from the flue gas. A first heater is in the gas flow path downstream of the particulate removal device for heating the flue gas to a first treatment temperature. A first catalytic converter is in the gas flow path downstream of the first heater for eliminating at least some carbon monoxide and sulfur dioxide from the flue gas. A second heater is in the gas flow path downstream of the first catalytic converter for heating the flue gas to a second treatment temperature. A second catalytic converter is in the gas flow path downstream of the second heater for eliminating at least some NOx from the flue gas. At least a first fan is provided for forcing the flue gas from the flue gas inlet to the treated gas outlet.

According to another aspect, an apparatus for carbon dioxide enrichment comprises a combustion furnace for generating a carbon dioxide rich flue gas. The combustion furnace has a flue gas outlet. A flue gas treatment apparatus has a flue gas inlet in communication with the flue gas outlet, a treated gas outlet downstream of the flue gas inlet, and a gas flow path therebetween. The flue gas treatment apparatus comprises a particulate removal device in the gas flow path for eliminating at least some particulate matter from the flue gas. A first heater is in the gas flow path downstream of the particulate removal device for heating the flue gas to a first treatment temperature. A first catalytic converter is in the gas flow path downstream of the first heater for eliminating at least some carbon monoxide and sulfur dioxide from the flue gas. A second heater is in the gas flow path downstream of the first catalytic converter for heating the flue gas to a second treatment temperature. A second catalytic converter is in the gas flow path downstream of the second heater for eliminating at least some NOx from the flue gas. At least a first fan is provided for forcing the flue gas from the flue gas inlet to the treated gas outlet.

The first catalytic converter may be a palladium-based catalytic converter.

The second treatment temperature may be higher than the first treatment temperature.

The particulate removal device may comprise a filter. The filter may be a fiberglass filter pad.

The first fan may be positioned upstream of the particulate removal device. The first fan may comprise an impeller mounted in a frame, and a motor driving the impeller. The motor may be positioned exterior to the frame and spaced from the gas flow path. The first fan may be a centrifugal fan. The motor may be drivingly connected to the impeller by a shaft extending through the frame.

The apparatus may further comprise a second fan. The second fan may be positioned downstream of the second catalytic converter. The second fan may be a suction fan.

The first treatment temperature may be between about 200 degrees Celsius and 250 degrees Celsius, more specifically between about 225 degrees Celsius and 235 degrees Celsius.

The second treatment temperature may be between about 300 degrees Celsius and 370 degrees Celsius, more specifically between about 345 degrees Celsius and 355 degrees Celsius.

The combustion furnace may be a biomass combustion furnace. The combustion furnace may be a wood pellet furnace.

According to another aspect, a method for carbon dioxide enrichment of a greenhouse comprises a) combusting a hydrocarbon fuel to generate a carbon dioxide rich flue gas; and b) treating the carbon dioxide rich flue gas to eliminate at least some toxic contaminants and generate a treated carbon dioxide rich gas stream, the treating comprising: eliminating at least some particulate material from the flue gas; eliminating at least some toxic contaminant gases from the flue gas by passing the flue gas through at least a first catalytic converter; and feeding the treated carbon dioxide rich gas stream to a greenhouse.

According to another aspect, a method for carbon dioxide enrichment of a greenhouse comprises a) combusting a hydrocarbon fuel to generate a carbon dioxide rich flue gas, and b) treating the carbon dioxide rich flue gas to eliminate at least some toxic contaminants and generate a treated carbon dioxide rich gas stream. The treatment comprises i) eliminating at least some particulate material from the flue gas; ii) after step i), heating the flue gas to a first treatment temperature; iii) after step ii), using a first catalytic converter to eliminate at least some carbon monoxide and sulfur dioxide from the flue gas; iv) after step iii), heating the flue gas to a second treatment temperature; and v) after step iv), using a catalytic converter to eliminate at least some NOx from the flue gas; and feeding the treated carbon dioxide rich gas stream to a greenhouse.

Step a) may comprise combusting biomass. Step a) may comprise combusting wood pellets.

Step i) may comprise passing the flue gas through a particulate filter.

Step ii) may comprise heating the flue gas to a first treatment temperature of between about 200 degrees Celsius and 250 degrees Celsius, more specifically between about 225 degrees Celsius and 235 degrees Celsius.

Step iv) may comprise heating the flue gas to a second treatment temperature of between about 300 degrees Celsius and 370 degrees Celsius, more specifically between about 345 degrees Celsius and 355 degrees Celsius.

The method may further comprise forcing flow of the flue gas with at least a first fan. The method may further comprise forcing flow of the flue gas with a first fan and a second fan.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any exclusive right granted by issuance of this patent application. Any invention disclosed in an apparatus or process described below and for which an exclusive right is not granted by issuance of this patent application may be the subject matter of another protective instrument, for example, a continuing patent application, and the applicants, inventors or owners do not intend to abandon, disclaim or dedicate to the public any such invention by its disclosure in this document.

Carbon dioxide enrichment is a technique whereby carbon dioxide is supplied to a greenhouse to enhance photosynthesis and improve the growth of greenhouse plants. Carbon dioxide enrichment may be practiced by combusting hydrocarbon fuels, such as natural gas, to provide a source of carbon dioxide.

Biomass combustion furnaces are known to be used for greenhouse heating. Combustion of biomass in these biomass furnaces provides a potential source of carbon dioxide for carbon dioxide enrichment. However, biomass combustion is not as clean as natural gas combustion, and yields flue gases that are high in contaminants such as, but not limited to, nitrogen oxides (NOx), sulfur oxides (SOx), carbon monoxide (CO), volatile organic compounds (VOCs), as well as particulates such as soot, char, and/or tar, all of which can be toxic to plants. Due to the presence of these toxic contaminants, flue gases from biomass furnaces are not typically used for carbon dioxide enrichment.

The present disclosure describes an apparatus and method for carbon dioxide enrichment, which involves combusting biomass to produce a carbon dioxide rich flue gas, and treating the flue gas to eliminate at least some toxic contaminants therefrom, to thereby provide a carbon dioxide stream that may be used for carbon dioxide enrichment. As set out in the Examples section below, it has been determined that the flue gas treatment apparatuses as described herein may significantly reduce the amount of toxic contaminants such carbon monoxide, sulfur dioxide, NOx, and VOCs in the flue gas from a biomass combustion furnace, to yield a carbon dioxide rich gas stream that is suitable for carbon dioxide enrichment in a greenhouse. For example, the flue gas treatment apparatuses disclosed herein may reduce the amount of CO in the flue gas from 1100 ppm to less than 1 ppm, may reduce the amount of nitric oxide (NO) in the flue gas from 70 ppm to 10 ppm, may reduce the amount of sulfur dioxide ($SO_2$) in the flue gas from 19 ppm to less than 1 ppm, and may leave no visual trace of particulates in the flue gas. Furthermore, the heat generated by the combustion furnace may be used to heat the greenhouse.

Figure 1:
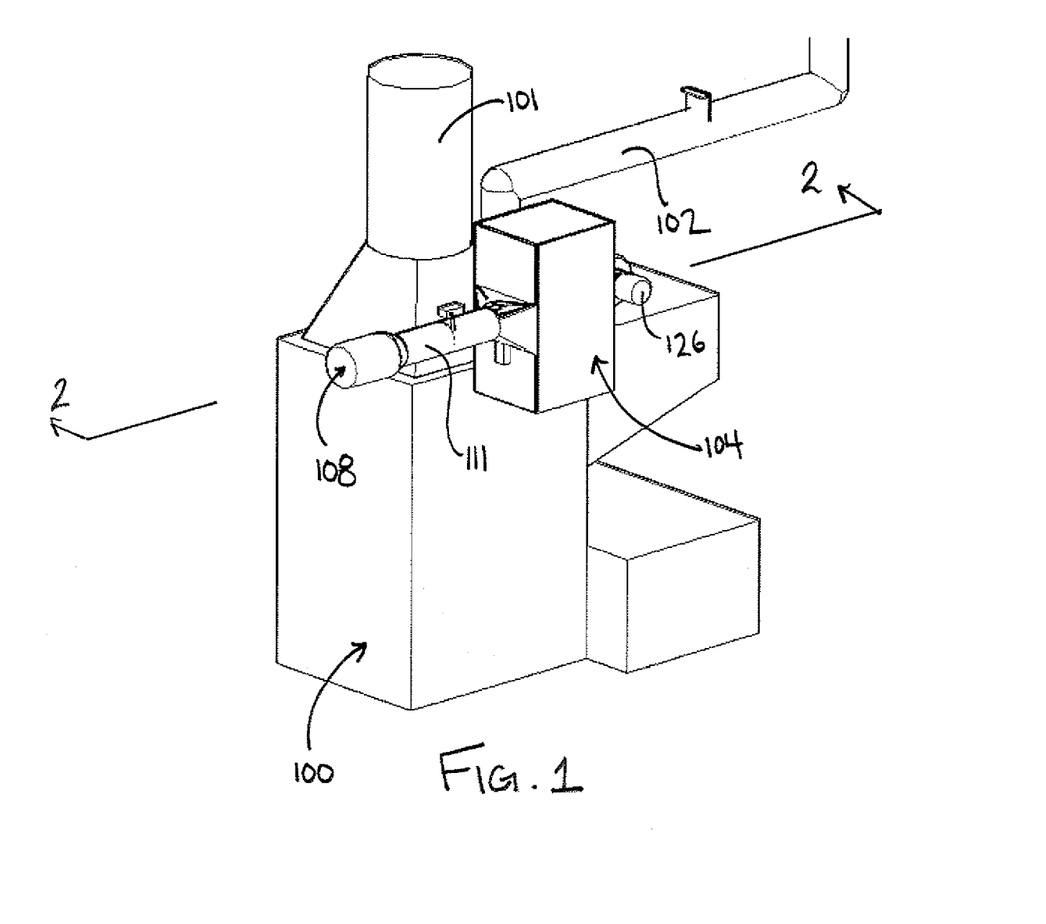
FIG. 1 is a perspective view of an example apparatus for carbon dioxide enrichment.

Referring now to FIG. 1, an example combustion furnace 100 is shown. The combustion furnace may be any suitable combustion furnace in which a hydrocarbon fuel may be combusted to generate a carbon dioxide rich flue gas. For example, the combustion furnace may be a biomass combustion furnace such as a wood pellet combustion furnace. The combustion furnace may optionally include a hot air duct 101 for supplying hot air to a nearby structure, such as the greenhouse to which the carbon dioxide may ultimately be supplied. For example, air may be blown past a heat exchanger in the furnace and to the greenhouse via the hot air duct 101. The combustion furnace 100 further includes a flue gas outlet 102, through which flue gases exit the furnace.

Referring still to FIG. 1, a flue gas treatment apparatus 104 is connected to the flue gas outlet 102 of the combustion furnace 100, for treating the carbon dioxide rich flue gas to eliminate at least some contaminants therefrom and generate a treated carbon dioxide rich gas stream. In the example shown, the flue gas treatment apparatus 104 is connected to the flue gas outlet 102 of the combustion furnace 100 such that a portion of the flue gas exiting the flue gas outlet 102 passes into the flue gas treatment apparatus 104. For example, a tee-fitting (not shown) may be installed on the flue gas outlet to divert a portion of the flue gas to the flue gas treatment apparatus 104. In alternative examples, the flue gas treatment apparatus 104 may be connected to the flue gas outlet 102 of the combustion furnace 100 such that all of the flue gas exiting the flue gas outlet 102 passes into the flue gas treatment apparatus 104.

The flue gas treatment apparatus 104 may generally include a particulate removal device for eliminating at least some particulate matter from the flue gas, at least a first catalytic converter downstream of the particulate removal device for eliminating at least some toxic contaminant gases from the flue gas, and at least a first fan for forcing the flue gas through the flue gas treatment apparatus 104.

Figure 2:
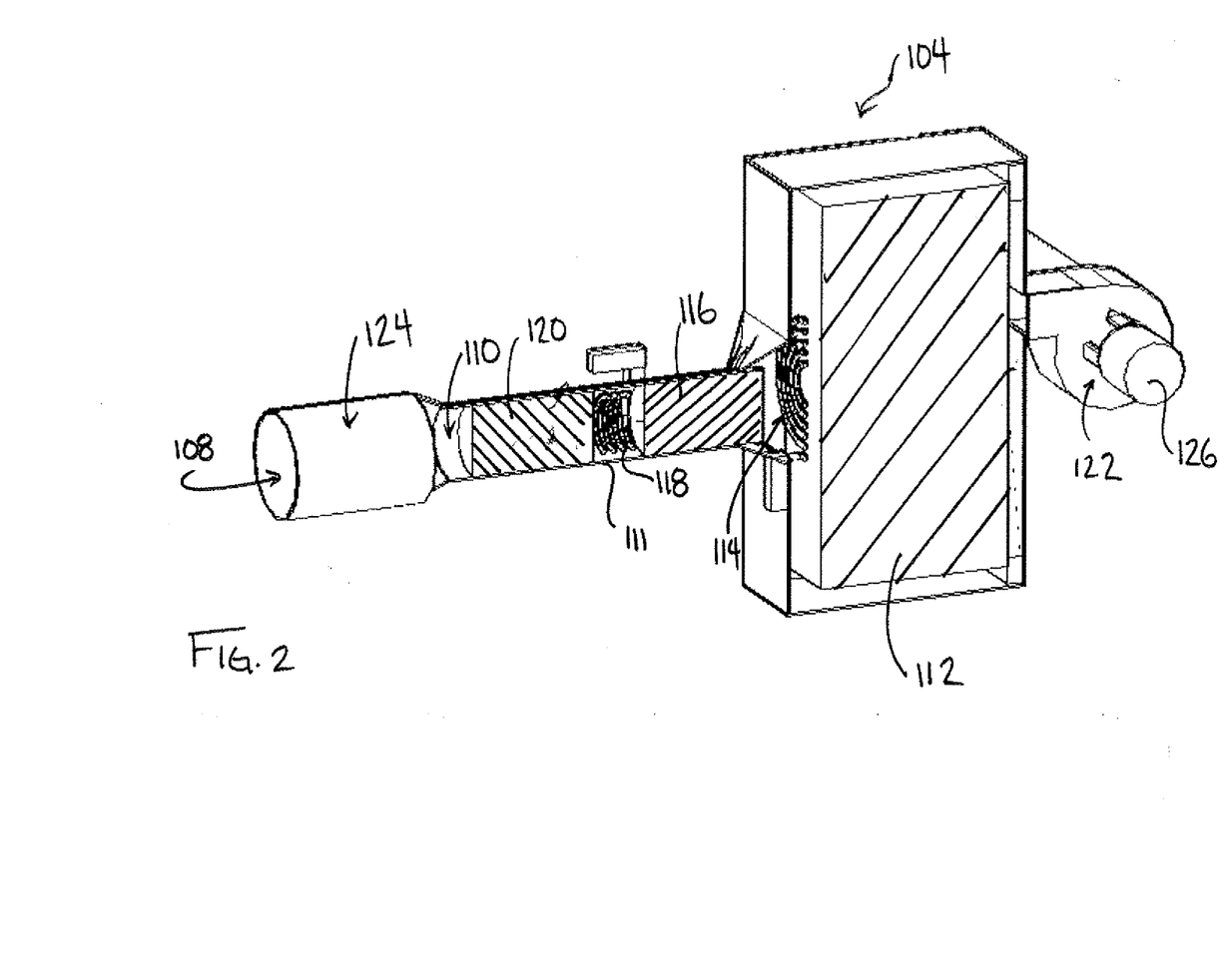
FIG. 2 is a cross section taken along line 2-2 in FIG. 1.

Referring to FIGS. 1 and 2, in the example shown, the flue gas treatment apparatus 104 includes a flue gas inlet 106 (shown in FIG. 3) in communication with the flue gas outlet 102 of the combustion furnace, a treated gas outlet 108 downstream of the flue gas inlet 106, and a gas flow path 110 therebetween. The gas flow path 110 may be defined by a frame 111. In the example shown, the frame 111 is a galvanized steel frame sealed with metallic sealing tape.

Referring still to FIG. 2, in the example shown, a particulate removal device 112 (also referred to as a particulate emission reduction device) is positioned in the gas flow path. The flue gas may be passed through the particulate removal device 112 for eliminating at least some particulate matter from the flue gas. The particulate removal device may include, for example, a filter. In one particular example, the filter is a rigid box filter including a fiberglass filter pad. It has been determined that such filters can withstand the high temperatures of the flue gas leaving the combustion furnace, which can in some examples be about 215 degrees Celsius. Some such fiberglass filter pads may trap particulates having a diameter of as low as 0.3 microns, and may have an efficiency of 95%. In other examples, other types of filters may be used, such as a bag filter, a HEPA filter, or an ionic air filter.

In alternative examples, the particulate removal device may include, but is not limited to, a settling chamber, a cyclone, an electrostatic precipitator, or a scrubber.

Referring still to FIG. 2, in the example shown, a first heater 114 and a first catalytic converter 116 are positioned in the gas flow path. The first heater 114 is downstream of the particulate removal device 112, and the first catalytic converter 116 is downstream of the first heater 114. The flue gas may be passed through the first catalytic converter 116 to eliminate at least some toxic contaminant gases from the flue gas, and the first heater 114 may heat the flue gas to a first treatment temperature, to enhance the efficiency of the first catalytic converter 116.

The first catalytic converter 116 may be any suitable catalytic converter that eliminates at least some toxic contaminants from the flue gas. In one example, the first catalytic converter 116 eliminates at least some carbon monoxide (CO) and sulfur dioxide ($SO_2$) from the flue gas, by converting the carbon monoxide and sulfur dioxide to less harmful gases, such as carbon dioxide and sulfur trioxide ($SO_3$), which combines with humidity (water) to form $H_2SO_4$ in the air, and can easily be removed from the air. In one example, the first catalytic converter 116 is a universal type palladium-based catalytic converter. For example, the first catalytic converter 116 may be a universal catalytic converter containing a loading of 318 micrograms/$cm^3$ of palladium (and no rhodium or platinum) sold by Catalyseur National (St. Hubert, Quebec, Canada). In alternative examples, other types of catalytic converters may be used.

It has been determined that temperatures above approximately 250 degrees Celsius in the first heater may lead to thermally catalyzed production of NOx in the flue gas. Accordingly, in some examples, the first treatment temperature may be selected to enhance the removal of carbon monoxide and sulfur dioxide from the flue gas in the first catalytic converter 116, while minimizing the production of NOx by the first heater 114. For example, the first treatment temperature may be at most about 250 degrees Celsuis, more specifically between about 200 degrees Celsius and 250 degrees Celsius, more specifically between about 225 Celsius and 235 degrees Celsius. In one particular example, the first heater 114 may be set to about 230 degrees Celsius. It has been determined that temperatures in this range allow for elimination of a significant portion of CO and $SO_2$ from the flue gas, while preventing, minimizing, or limiting thermally catalyzed production of NOx.

In some examples, the first heater 114 may be an electric heating element.

Referring still to FIG. 2, in the example shown, a second heater 118 and a second catalytic converter 120 are positioned in the gas flow path. The second heater 118 is downstream of the first catalytic converter 116, and the second catalytic converter 120 is downstream of the second heater 118. The flue gas may be passed through the second catalytic converter 120 to eliminate at least some additional toxic contaminant gases from the flue gas, and the second heater 118 may heat the flue gas to a second treatment temperature, to enhance the efficiency of the second catalytic converter 120.

The second catalytic converter 120 may be any suitable catalytic converter that eliminates at least some toxic contaminant gases from the flue gas. In one example, the second catalytic converter 120 eliminates at least some NOx from the flue gas, by converting the NOx to less harmful gases such as $N_2$. In some particular examples, the second catalytic converter 120 may be a California CARB Compliant Universal Catalytic Converter sold by Magnaflow (California, USA).

In some examples, the second treatment temperature may be selected to enhance the removal of NOx from the flue gas in the second catalytic converter 120. For example, the second treatment temperature may be higher than the first treatment temperature. In some examples, the second treatment temperature may be between about 300 degrees Celsius and 370 degrees Celsius, more specifically between about 345 degrees Celsius and 355 degrees Celsius. In one particular example, the second heater 118 may be set to about 350 degrees Celsius. Although some NOx may be thermally produced in the second heater when operating at this temperature, it has been determined that this excess NOx is largely eliminated by the second catalytic converter 120.

In some examples, the second heater 118 may be an electric heating element.

In alternative examples, the first heater and/or the second heater may be omitted, and the first and/or second catalytic converters may be operated at the ambient temperature of the flue gas. In further alternative examples, the flue gas treatment apparatus may include only a single catalytic converter, as shown in the Examples section below.

Referring to FIGS. 1 and 2, at least a first fan may be provided for forcing the flue gas from the flue gas inlet to the treated gas outlet. In the example shown, a first fan 122 and a second fan 124 are provided. The first fan 122 is positioned upstream of the particulate removal device 112, and the second fan 124 is positioned downstream of the second catalytic converter 120.

Referring still to FIG. 2, in the example shown, the second fan 124 is an in-line duct fan, and may also be referred to as a suction fan.

Figure 3:
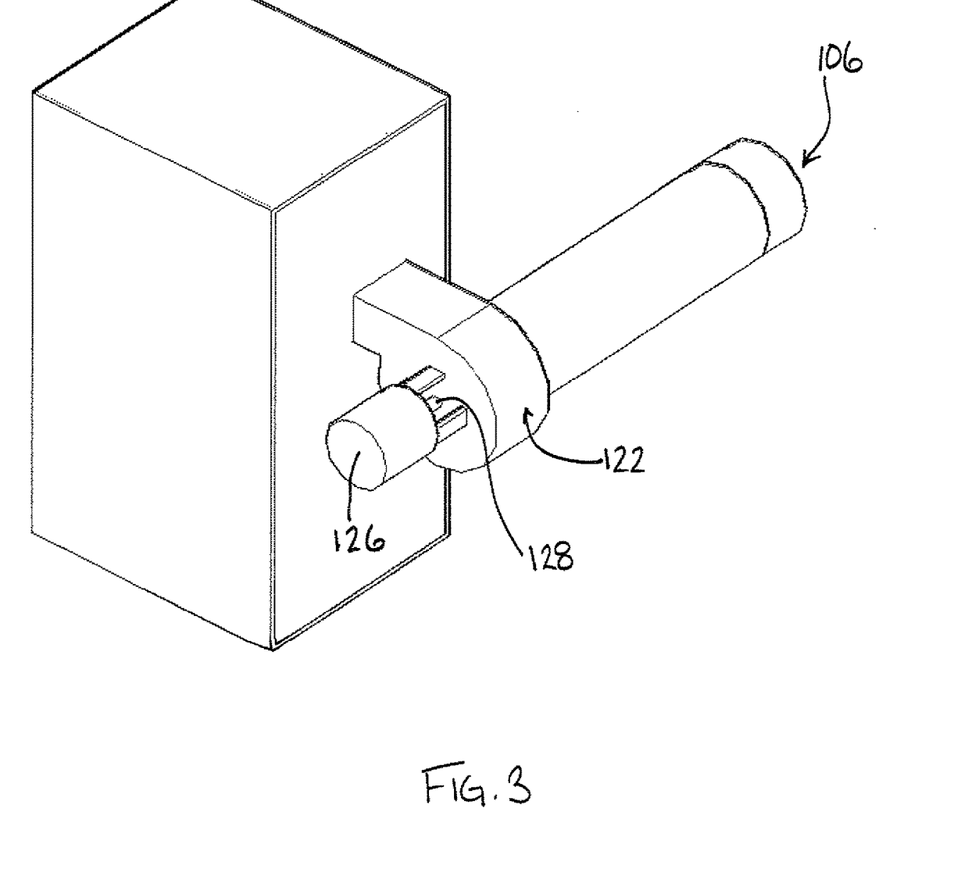
FIG. 3 is an enlarged perspective view of the first fan of FIG. 1.
Figure 4A:
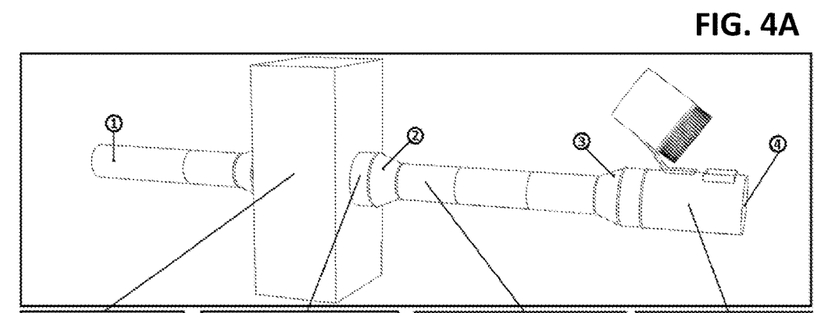
FIG. 4A is a photograph of a prototype apparatus for carbon dioxide enrichment.
Figure 4B:
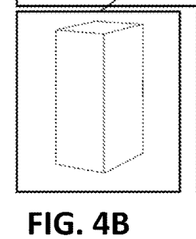
FIG. 4B is a photograph of the filter of the prototype of FIG. 4A.
Figure 4C:
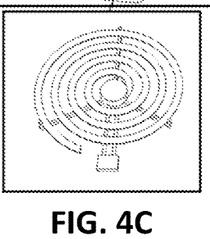
FIG. 4C is a photograph of the heater of the prototype of FIG. 4A.
Figure 4D:
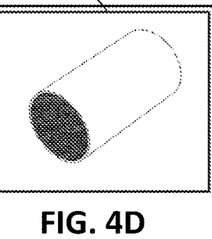
FIG. 4D is a photograph of the catalytic converter of the prototype of FIG. 4A.
Figure 4E:
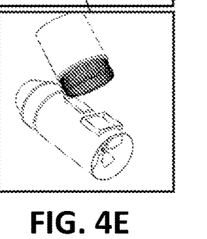
FIG. 4E is a photograph of the suction fan of the prototype of FIG. 4A.

Referring also to FIG. 3, in the example shown, the first fan 122 is a centrifugal fan, and includes an impeller (not shown) mounted in the frame 111 and positioned in the gas flow path 110, and a motor 126 driving the impeller. In order to protect the motor 126 from heat of the flue gas and reduce the risk of the motor 126 overheating, the motor 126 is positioned exterior of the frame 111, and spaced from the gas flow path 110. A shaft 128 extends through the frame 111 between the motor 126 and the impeller for connecting the motor 126 to the impeller. In some examples, a supplementary fan may be provided in order to provide additional cooling to the motor.

The treated gas outlet 108 is downstream of the second fan 124. The treated carbon dioxide rich gas stream leaving the treated gas outlet may be fed to a greenhouse, for the purpose of carbon dioxide enrichment.

The flue gas treatment apparatus 104 may be provided together with the combustion furnace 100, or may be provided as a separate unit that can be connected in fluid communication with a flue gas outlet of the combustion furnace 100. For example, the flue gas treatment apparatus 104 may be retrofitted to pre-existing combustion furnaces.

The examples described above relate to the combustion of biomass, and particularly wood pellets, in a biomass combustion furnace. In alternative examples, other types of biomass may be combusted, such as but not limited to products, by-products, residues, and waste from agriculture and forestry industries, and industrial and municipal wastes. Furthermore, the biomass may be provided in its raw form, or in a processed form such as pellets, chips, or brickettes.

In further alternative examples, types of fuel other than biomass fuel may be combusted, and other types of furnaces may be used.

It has been determined that it is advantageous to provide the particulate removal device upstream of the catalytic converters, because particulates may foul the catalytic converters. However, in alternative examples, the particulate removal device may be provided downstream of the catalytic converters.

While the above description provides examples of one or more processes or apparatuses, it will be appreciated that other processes or apparatuses may be within the scope of the accompanying claims.

EXAMPLES

Material and Method

A wood pellet combustion furnace was installed inside a tunnel greenhouse and two different prototype flue gas treatment apparatuses were installed on the flue gas outlet (also referred to as a chimney) of the furnace. For each of them, the composition of the flue gas produced during wood pellet combustion was analysed and recorded. The specification of the furnace, wood pellets used, and testing instruments are provided in the following section.

Furnace

A biomass furnace (SBI, Caddy Alterna) was installed inside a tunnel greenhouse located on the Macdonald campus of McGill University, Quebec, Canada. The furnace was equipped with a 4 inch chimney, a 500 Watt lighter, a central computer allowing to control the input power, which can be set to 4.98, 17.58, 23.45, 29.31 and 35.17 Kw (17 000, 60 000, 80 000, 100 000 and 120 000 Btu/hr) (PSG 2011). Based on dealer specification, this furnace has an average efficiency of 81.2% (PSG 2011).

Wood Pellets

The biomass used during the experiment was premium grade wood pellets made with 100% hardwood. As specified by the manufacturer (Valfei product. inc, Quebec, Canada), the wood pellets contain no additive and chemical and produce less than 1% of ash and less than 0.5% of fines. Wood pellets have an average diameter of 0.25 inches and a length of 0.75 inches Gas Analysis The composition of the flue gas produced during wood pellet combustion and treatment of the flue gas was analysed using the TESTO 335 portable analyzer (Testo Inc., Lenzkirch, Germany). This analyser has a resolution of 100 ppb for CO, NO and $NO_2$ and a resolution of 1 ppm for $SO_2$ (Testo 2011). VOC analyses were performed using VOC detectors (Reed GD-3300) which have sensitivity of 50 ppm for methane (Reedinstrument 2013). Volatile organic compound analysis was required in order to detect the presence of ethylene which can be detrimental to plants.

Prototypes: Design and Results

Prototype 1: One Heater and One Catalytic Converter

A prototype flue gas treatment apparatus was assembled and included, in series, an air filter, a heater, a catalytic converter, and a fan that suctions the air and forces it to pass through the system.

The air filter was a fiberglass filter as described above

The heater was set at 230 degrees Celsius.

The catalytic converter was universal type catalytic converter as described above.

The prototype was connected to the flue gas outlet of the biomass furnace. A photograph of the prototype is shown in FIGS. 4A to 4E.

Figure 5:
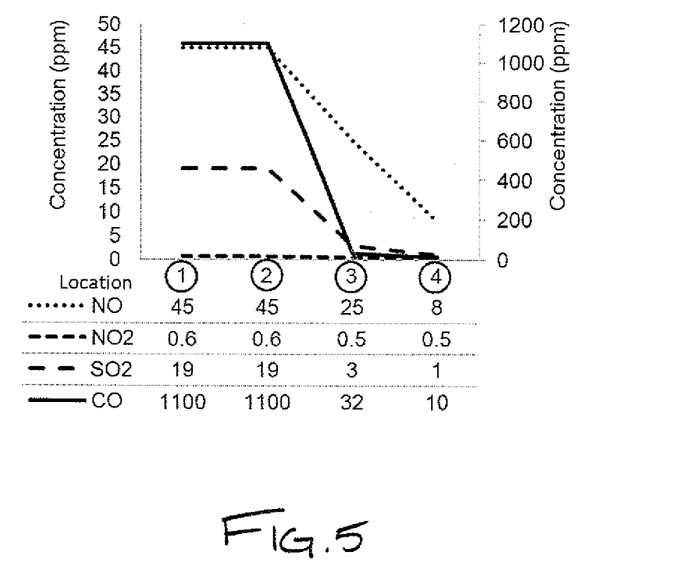
FIG. 5 is a graph showing the concentration of various gases at the points depicted in FIGS. 4B to 4E.

As can be seen in FIG. 5, the concentrations of major toxic contaminant gases at the treated gas outlet are significantly reduced.

Prototype 2: Two Heaters and Two Catalytic Converters

Prototype 1 was modified to include a second heater and a second catalytic converter. The second heater was set at 350 degrees Celsius. The second catalytic converter included a California CARB Compliant Universal Catalytic Converter sold by Magnaflow (California, USA).

An additional fan was also installed upstream of the filter to increase the air flow rate. The fan was a centrifugal fan, including a motor spaced away from the impeller, as described above. A supplementary fan was used to cool the motor.

Figure 6:
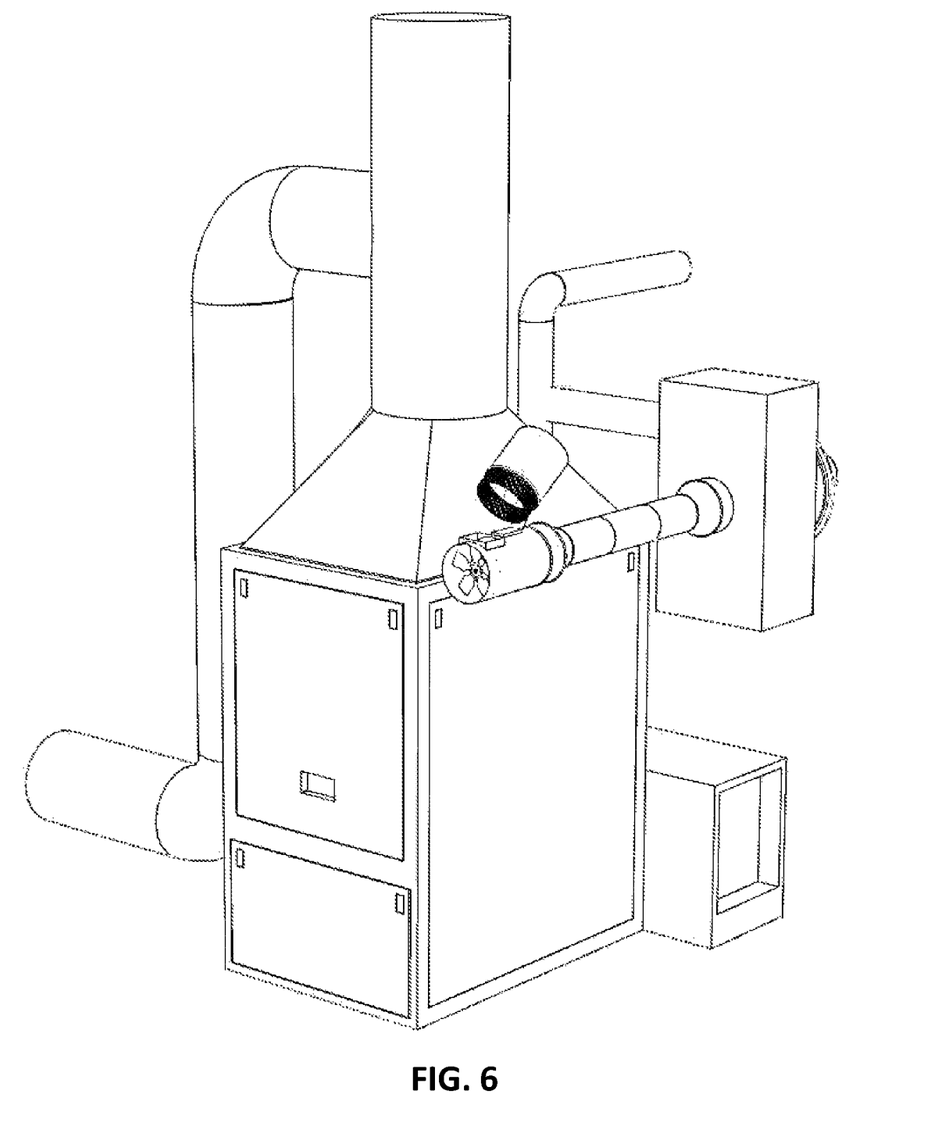
FIG. 6 is a photograph of another prototype apparatus for carbon dioxide enrichment.

Prototype 2 was connected to the flue gas outlet of the biomass furnace. A photograph of the prototype is shown in FIG. 6.

Prototype 2 was able to reduce CO concentrations from 1100 to less than 1 ppm, NO from 70 to approximately 5.2 ppm and $SO_2$ from 19 to less than 1 ppm. Moreover, there was no visual trace of particulates exiting the system. In addition, volatile organic compounds were not detected at the exit of the system using the Reed GD-3300 analyser, which confirms that no significant amount of ethylene is released into the greenhouse.

The furnace in combination with Prototype 2 was installed in a double layer polyethylene greenhouse that has an approximate volume of 370 m³. It can be expected that this type of greenhouse will experience 0.5 air change per hour, excluding the effect of the ventilation. At maximum input power of 35.17 KW, the volumetric flow rate of treated carbon dioxide rich gas stream was, on average, 0.001 m³/s. Therefore, the naturally occurring dilution factor can be calculated using equation 1. Using this formula, it can be found that the naturally occurring dilution factor is approximately 50.

$$\text{Dilution factor} = \frac{\text{Greenhouse air exchange flow rate}}{\text{Purified flue gas flow rate}} \quad (1)$$

Table 1 shows the concentrations of toxic contaminant gases at the exit of the flue gas treatment apparatus, as well as their theoretical concentration in the ambient air of the greenhouse. These results are satisfactory since they meet air quality criterion for greenhouse environment after dilution into the ambient air of the greenhouse.

TABLE 1

Prototype 2 emission at the exit of the flue gas treatment system

| Gases | Exit of Flue Gas Treatment System [ppm] | Ambient air of greenhouse |
|---|---|---|
| CO | ~0 (at ppm level) | <0.01[a] |
| NO | 5.2 | 0.1 |
| NOx | 5.5 | 0.11 |
| $SO_2$ | ~0 (Resolution 1 ppm) | <0.01[a] |
| VOC | Not detectable using Reed GD-3300 | Not detectable using Reed GD-3300 |
| Particles | Not visible | Not visible |

[a] Since CO and $SO_2$ were not detected at ppm level, the calculations were made assuming a concentration of 0.5 ppm.

The invention claimed is:

1. An apparatus for carbon dioxide enrichment comprising:

a) a biomass combustion furnace for generating a carbon dioxide rich flue gas, the biomass combustion furnace having a flue gas outlet; and b) a flue gas treatment apparatus having a flue gas inlet in communication with the flue gas outlet, a treated gas outlet downstream of the flue gas inlet, and a gas flow path therebetween, the flue gas treatment apparatus comprising:

i) a particulate removal device in the gas flow path for eliminating at least some particulate matter from the flue gas;

ii) a first heater in the gas flow path downstream of the particulate removal device, the first heater for heating the flue gas to a first treatment temperature;

iii) a first catalytic converter in the gas flow path downstream of the first heater for eliminating at least some carbon monoxide and sulfur dioxide from the flue gas;

iv) a second heater in the gas flow path downstream of the first catalytic converter for heating the flue gas to a second treatment temperature;

v) a second catalytic converter in the gas flow path downstream of the second heater for eliminating at least some NOx from the flue gas; and vi) at least a first fan for forcing the flue gas from the flue gas inlet to the treated gas outlet;

wherein the treated gas outlet is connected to a greenhouse for feeding the treated gas to the greenhouse for carbon dioxide enrichment.

2. The apparatus of claim 1, wherein the first catalytic converter is a palladium-based catalytic converter.

3. The apparatus of claim 1, wherein the first treatment temperature is lower than the second treatment temperature.

4. The apparatus of claim 1, wherein the particulate removal device comprises a filter.

5. The apparatus of claim 4, wherein the filter is a fiberglass filter pad.

6. The apparatus of claim 1, wherein the first fan is positioned upstream of the particulate removal device.

7. The apparatus of claim 1, wherein the first fan comprises an impeller mounted in a frame, and a motor driving the impeller, and wherein the motor is positioned exterior to the frame and is spaced from the gas flow path.

8. The apparatus of claim 7, wherein the motor is connected to the impeller by a shaft extending through the frame.

9. The apparatus of claim 1, further comprising a second fan, the second fan positioned downstream of the second catalytic converter.

10. The apparatus of claim 1, wherein the first treatment temperature is between about 200 degrees Celsius and 250 degrees Celsius.

11. The apparatus of claim 1, wherein the second treatment temperature is between about 300 degrees Celsius and 370 degrees Celsius.

12. A flue gas treatment apparatus for treating a carbon dioxide rich flue gas, the flue gas treatment apparatus comprising:

a) a flue gas inlet connectable in fluid communication with a flue gas outlet of a combustion furnace, a treated gas outlet downstream of the flue gas inlet, and a gas flow path therebetween, wherein the gas flow path is defined by a frame;

b) a particulate removal device in the gas flow path for eliminating at least some particulate matter from the flue gas;

c) a first heater in the gas flow path downstream of the particulate removal device, the first heater for heating the flue gas to a first treatment temperature;
d) a first catalytic converter in the gas flow path downstream of the first heater for eliminating at least some carbon monoxide and sulfur dioxide from the flue gas;
e) a second heater in the gas flow path downstream of the first catalytic converter for heating the flue gas to a second treatment temperature;
f) a second catalytic converter in the gas flow path downstream of the second heater for eliminating at least some NOx from the flue gas; and
g) at least a first fan and a second fan for forcing the flue gas from the flue gas inlet to the treated gas outlet, wherein the first fan is a centrifugal fan that is upstream of the particulate removal device and comprises an impeller mounted in the frame and a motor driving the impeller, wherein the motor is positioned exterior to the frame and is spaced from the gas flow path, and wherein the motor is connected to the impeller by a shaft extending through the frame, and wherein the second fan is an in-line duct fan that is downstream of the second catalytic converter.

\* \* \* \* \*